Feb. 9, 1971 R. B. FREEMAN 3,561,249
BLIND RIVET TOOL WITH MODULATED FORCE LINKAGE
Filed Nov. 29, 1968 3 Sheets-Sheet 2

INVENTOR.
RICHARD B. FREEMAN
BY
ATTORNEYS

FIG. 5

# United States Patent Office 3,561,249
Patented Feb. 9, 1971

3,561,249
BLIND RIVET TOOL WITH MODULATED
FORCE LINKAGE
Richard B. Freeman, 3354 Dorchester Road,
Shaker Heights, Ohio 44120
Filed Nov. 29, 1968, Ser. No. 779,935
Int. Cl. B21d 9/05; B23p 19/00
U.S. Cl. 72—391                 7 Claims

ABSTRACT OF THE DISCLOSURE

A manually operated tool for setting blind rivets and having a pivoted handle whose short lever arm end is bifurcated and engages a cylindrical cross spin which is transversely mounted in a collet body. The collet body is mounted for reciprocal movement in the housing to which the operating handle is secured and is provided with mandrel-engaging jaws for gripping and exerting a pulling force on the mandrel or stem of a blind rivet which is mounted in the nose piece of the tool.

BACKGROUND OF THE INVENTION

The invention is directed principally to hand tools used for the setting of blind rivets in the field of metal assemblies, although some of the principles of the invention can find utility in other hand tool applications where a modulated tension producing force linkage is required.

Blind rivets are well known in the art and consist of a headed mandrel or shank of specified diameter and length on which is carried a deformable or expandable body or insert of a size which can be received in a hole provided in the sheets or pieces to be joined. With the blind rivet held in position by the nose piece of a tool, the mandrel or shank is gripped and force is applied thereto to pull the headed portion of the shank into deforming relationship to the insert piece and thereby clamp or rivet the sheets or pieces with headed portions on opposite sides of the hole. As the applied force reaches a value which exceeds the elastic limit of the shank, it fractures, leaving the headed portion within the assembled rivet joint and permitting the remainder of the shank to be discarded.

The tools used for the setting of blind rivets consist essentially of a sized nose piece in which the rivet can be mounted for application, a gripping means, usually in the form of spring loaded jaws, for embracing the shank and coupling it to a pulling force, and means for applying the pulling force to cause deformation of the insert and fracture of the mandrel. In high production assembly lines and the like, the force is generally applied through power means, but in field work and in maintenance work the force is generally manually applied through a mechanical force-compounding linkage which is provided by a pivoted lever forming part of the manually operated tool. Inasmuch as the force required to be applied to the mandrel can range up to 1500 pounds or so and is ordinarily about 1000 pounds, in contrast to the 100 pounds or so of hand force which can be exerted, the lever arm of the hand tools is customarily designed to have a high mechanical advantage to produce a force ratio on the order of 16:1. However, as the tool is operated and the lever arm is rotated, this mechanical advantage tends to decrease as a result of two principal factors: (a) the short arm of the lever tends to increase in length during the operating stroke to cause decrease in the mechanical advantage ratio, and (b) the angle of contact of the short lever arm as related to the direction of movement or travel of the collet, tends to become increasingly severe and less effective to transmit the operative vector of force.

The prior art hand tools conventionally utilize a pivoted lever whose short arm is bifurcated and provided with ears having an arcuate periphery which straddle the collet body and are closely received in transverse recesses provided on opposite sides of the collet body. The recesses or notches in the collet body provide shoulders or abutments against which the arcuate periphery of the lever arm ears is directed when the manual gripping force is applied to the long arm of the lever. The force-compounding linkage is so designed that the maximum mechanical advantage is attained at the start of the operative stroke of the tool and, due to the progressive increase in the length of the short lever arm and the increase in the angle of force contact, there is a significant and progressive drop-off of applied force on the blind rivet mandrel from the start to the finish of the operative stroke. Furthermore, as the angularity of contact to the direction of travel increases during the stroke, an undesired force vector is produced of progressively greater magnitude in a direction transverse to the direction of travel of the collet, which produces a binding effect on the collet with a consequential increase in friction of the force linkage which must be further overcome by increased manual pressure or force.

If these hand tools were required to be designed and used for blind rivet applications in which all the conditions were unvarying, then the above-mentioned factors would not be particularly disadvantageous as the tool would be designed to perform its function and complete its work during the first 15 or 20 percent of its stroke and, fracture having occured, the force characteristics which might prevail during the remainder of the stroke would be immaterial. However, the nonproduction uses for which the hand tools are customarily utilized are inherently not of a character in which uniform conditions of blind rivet application are encountered. The tool can handle only a small range of rivet sizes, despite the fact that the maintenance or repair condition which is encountered in the field may ideally require a size of rivet which is smaller or larger than the range of sizes carried by the repair man. Similarly, the thickness of the stock to be riveted may well be greater or lesser than the thickness of stock for which the rivet is designed and intended. There is little uniformity of application in the use of the hand tool, in contrast to the uniformity of application which ordinarily exists in high production work where power tools are customarily used. Nevertheless, the force linkage design of the prior art hand tools ignores the variable factors which arise in the use of these tools and provide a single purpose force linkage system premised upon ideal application conditions which are seldom met. As a consequence, these hand tools become difficult and sometimes impossible to manipulate successfully if the conditions of blind rivet application involve any significant deviation from the ideal or optimum conditions of rivet size and stock thickness for which the force linkage of the hand tool is designed.

SUMMARY OF THE INVENTION

In order to minimize and overcome the foregoing disadvantages, I have provided a blind rivet hand tool utilizing a yoke lever arm engaging a cylindrical cross pin which is mounted on the collet body. The circular or cylindrical surface of the cross pin is disposed rearwardly of the short arm of the lever so that the rate of increase in the length of the short arm of the lever during the operative stroke is less than it is in the prior art forms where the lever arm is arcuate and lies forwardly of a straight line abutment. Additionally, I have designed a force linkage for the hand tool in which the optimum angle of contact of the short arm of the lever is not attained until about half the stroke has been completed, in contrast to the prior art designs where the optimum angle of contact occurs at the initiation or start of the stroke. By so decreasing the rate of increase in the length of the short lever arm and controlling the angularity of contact so as to obtain optimum direction of thrust or pull at an intermediate position of the stroke, rather than at the start, I am able to achieve a modulated force linkage which will maintain a higher mechanical advantage during the stroke and will have less drop-off of force during the stroke, than exists in prior art designs.

These characteristics result in easier operation of the hand tool with less manual exertion and consequently provide the tool with greater versatility in meeting the varying conditions of application which arise in maintenance and repair work. These design characteristics also result in minimizing the friction-producing components of force which have been mentioned above, thus further contributing to the efficiency of the tool and its relative ease of operation.

The cross pin arrangement not only serves as a reaction element for the thrust of the lever, but also provides an expeditious and ingenious means for positioning the collet during the manufacturing assembly of the tool. The cross pin also serves as a guide and bearing for the jaw expander element of the collet.

In order to further attain the objectives of providing an improved and more efficient blind rivet hand tool, I have provided a shock absorbing cushion on the tool which is engaged by the lever arm at completion of the operative stroke, thus minimizing the jarring effect on the hand of the user which occurs when the workload on the lever arm is suddenly relieved at the time of fracture of the mandrel.

For convenient disposal of the fractured mandrel, the collet construction utilizes a hollow jaw expander which provides a discharge passageway toward the rear of the tool for the spent mandrel, without interfering with the loading of a new blind rivet in the nose piece of the tool.

Other objects and advantages of my invention will become apparent during the course of the following description.

DESCRIPTION OF THE DRAWINGS

FIG. 3 is an enlarged fragmentary cross-sectional view of the tool taken as indicated on line 3—3 of FIG. 2.

FIG. 4 is an enlarged fragmentary side elevation of a portion of the collet, showing the several positions of the lever during the operating stroke.

FIG. 5 is a graph showing the change in mechanical advantage and the modification thereof resulting from changes in the angle of contact during the operative stroke of a tool embodying the features of my force linkage arrangement as compared with these same characteristics of prior art hand tools.

DESCRIPTION OF THE PREFERRED EMBODIMENT

Figure 1:
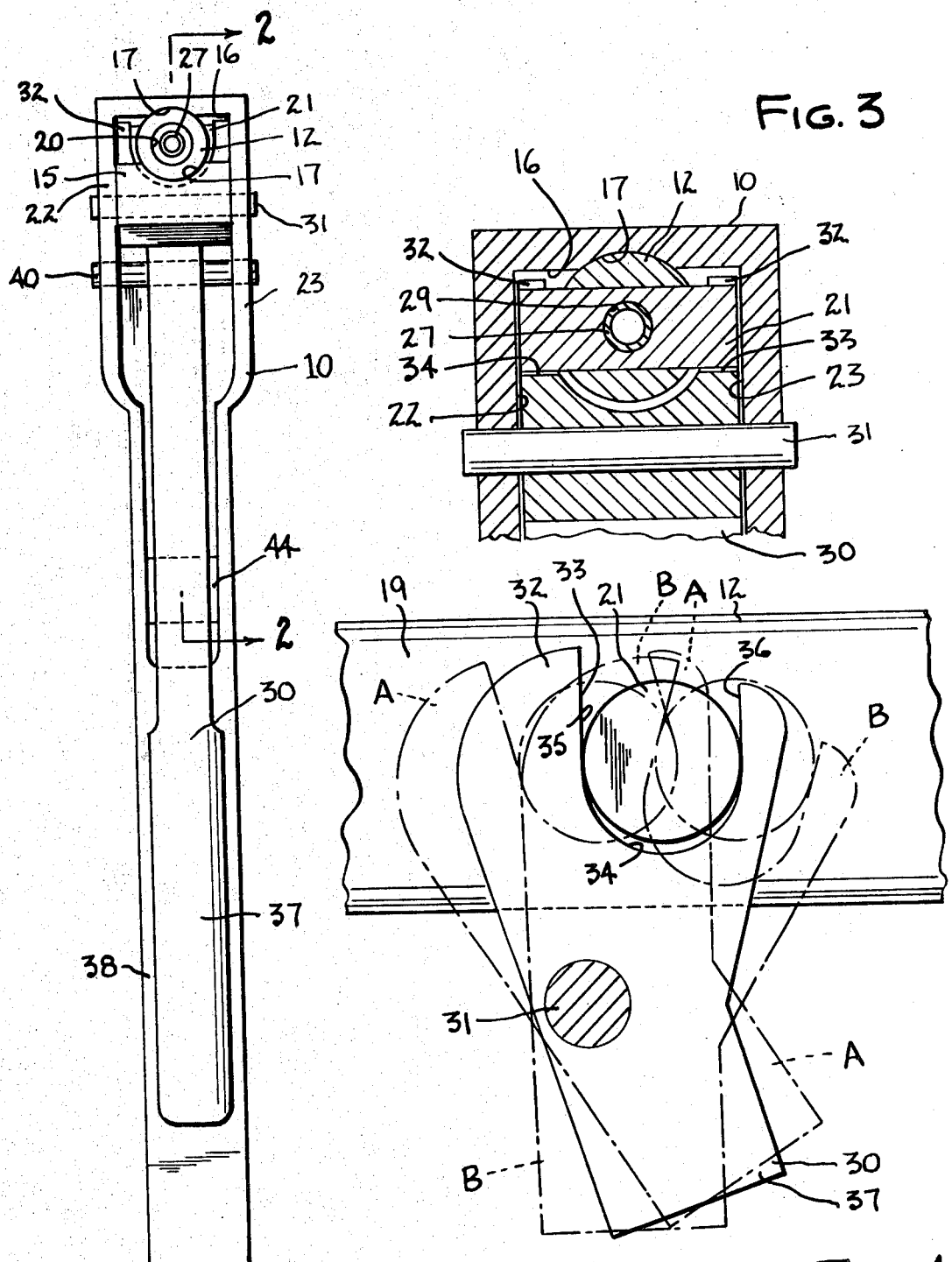
FIG. 1 is a view in rear elevation of a hand tool embodying the features of my invention.
Figure 2:
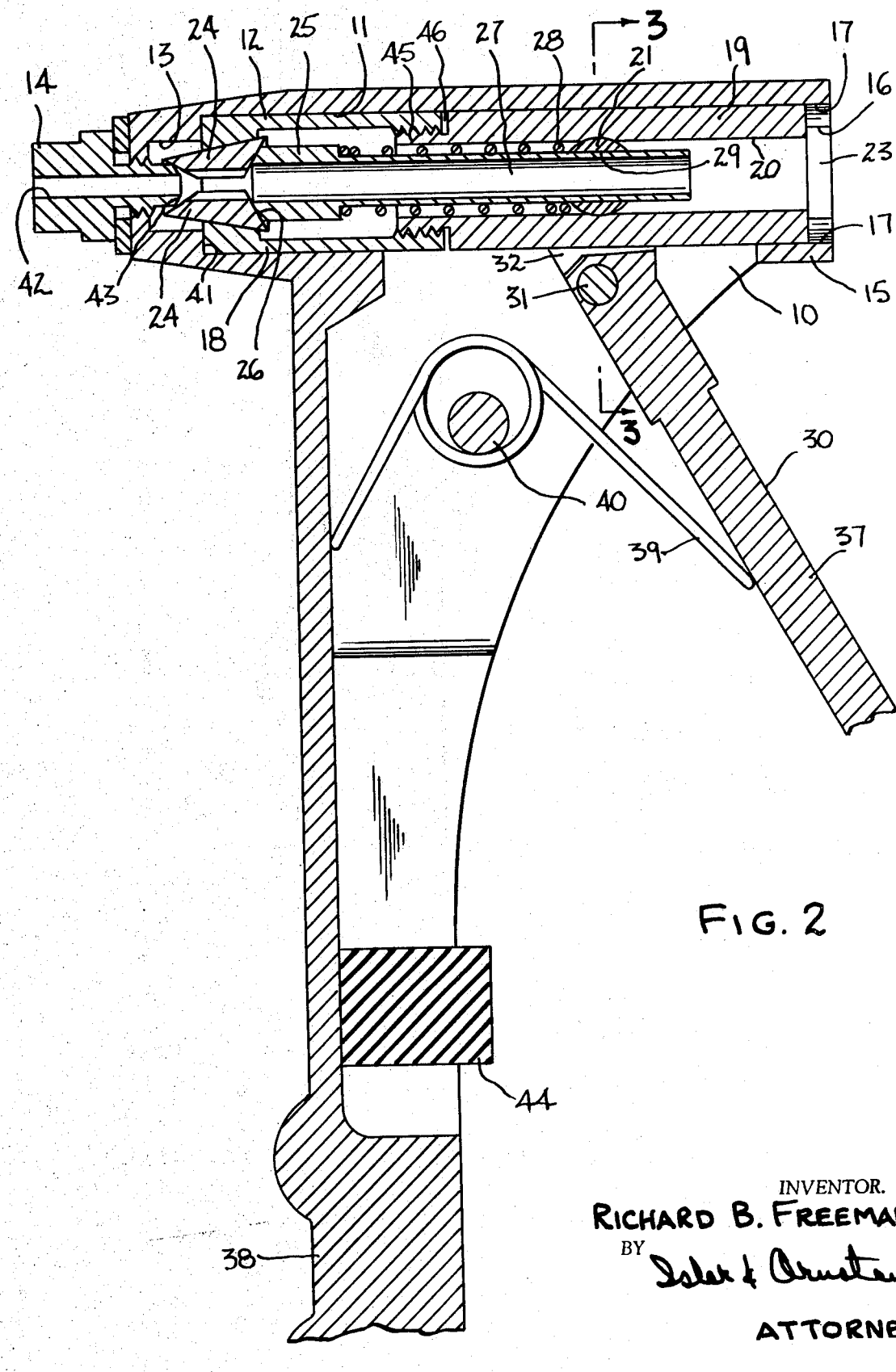
FIG. 2 is an enlarged fragmentary cross-sectional view, taken as indicated on line 2—2 of FIG. 1.

Referring more particularly to FIGS. 1, 2 and 3 of the drawings, I have shown a hollow cast housing 10, the upper portion of which is bored as at 11 to receive the forward end of the collet 12 and counterbored as at 13 to threadedly receive a nose piece 14. The open rear of the hollow housing is obstructed by a bridging member 15 which, in combination with the top wall 16 of the housing serves as a guide channel or guide support for the collet 12. Oppositely disposed arcuate recesses are provided in the top wall 16 and the bridging member 15 to slidably accommodate the collet 12.

The body of the collet 12 consists of two portions which are threadedly secured to each other. One of these is a jaw retaining portion 18 which comprises the front end of the collet body, and the other is a draw bar 19 which is provided intermediate its ends with a diametrically extending bore 20. Both the portions 18 and 19 of the collet body are hollow and open ended. Mounted in the bore 20 is a cylindrical cross pin 21 of greater length than the diameter of the draw bar 19 so as to extend to either side of the body portion 19 and slidably engage the parallel side walls 22 and 23 of the housing 10.

Mounted in the forward end of the body portion 18 are a pair of gripping jaws 24 having the conventional external conical configuration so as to define a varying size of gripping opening between the jaws as the jaws are moved inwardly or outwardly relatively to the open end of the collet body. A hollow jaw expander 25 having an end portion 26 shaped to conform with and engage the inner ends of the gripping jaws 24 is provided for yieldably maintaining the jaws in a closed or gripping position. The jaw expander 25 is provided with a guide tube 27 upon which is mounted a compression coil spring 28. The spring 28 has one end thereof seated against the jaw expander end 26 and has the other end thereof seated against the cross pin 21. The guide tube 27 extends through a bearing or guide opening 29 in the cross pin 21 in which it is slidably movable.

In the assembly of the tool during manufacture or repair, the cross pin, which is assembled to the collet body, serves a multiplicity of functions. As previously noted, it serves as a bearing and guide for the guide tube of the jaw expander element, as well as serving as a seat or reaction surface for one end of the coil spring 28. In addition to the foregoing, the ends of the cross pin which span the width of the interior of the housing 10 between the side walls 22 and 23 serve to maintain the collet body centrally of the housing and thus supplement the guiding function which is provided by the arcuate recesses 17. The cross pin 21 also prevents axial rotation of the collet body in the housing after it has been inserted, thus positioning the collet body in a predetermined manner so as to permit easy and convenient assembly connection of the operating lever arm thereto.

The operating lever arm 30 is pivotally mounted to the interior of the housing 10 by means of a pivot pin 31 which traverses the walls 22 and 23 of the housing. The upper end of the operating arm 30 is bifurcated to provide two transversely spaced yoke portions 32 defining open ended recesses 33 whose lower portion 34 is in the form of an arcuate semicircle which conforms closely to the diameter of the cross pin 21 and which extends tangently upwardly from the arcuate portion to provide the linear forward abutment 35 and the linear rearward abutment 36. For the linear displacement of the collet rearwardly, the abutment 35 acts against the front of the cross pin 21, and the abutment 36 acts on the cross pin in the reverse direction for the return movement of the collet.

Below the pivot pin 31, the lever arm 30 is provided with a long arm portion 37 which is suitably formed to be gripped by the hand of the user and drawn forwardly toward a rigid hand grip extension 38 which extends downwardly from the housing 10. As the long arm 37 of the operating lever 30 is moved forwardly in the manner indicated, the short arm of the lever defined by the yoke portion 32 moves rearwardly about the pivot pin 31 and, as it is engaged with the cross pin 21 it causes rearward longitudinal displacement of the collet 12. The long arm 37 is normally retained in its rearwardmost position by a spring 39 mounted on a pin 40 within the housing 10. It will be noted that the rearwardmost position of the long arm 37 is established by the abutment of the forward end of the jaw retaining portion 18 of the collet 12 with the annular shoulder 41 defined by the juncture of the bore 11 and the counterbore 13 in the housing 10.

The threaded counterbore 13 is adapted to have secured thereto any one of several different sizes of nose pieces 14, depending upon the particular diameter of blind rivet which is being utilized. Each nose piece is provided with a central passageway or bore 42 which is of a size approximating the diameter of the mandrel to be received therein. Additionally, the inner conical end 43 of each nose piece projects inwardly of the housing to a predetermined extent so as to engage and retract the gripping jaws 24 to a sufficient extent to permit clearance therethrough of the mandrel which is being utilized. For the blind rivet mandrels of larger diameter, the inner end 43 of the nose piece would project further into the housing to cause increased retraction of the gripping jaws 24 and thus cause them to open into an enlarged receiving position, whereas for the mandrels of smaller diameter, the nose piece 14 which would be used would have an inner end 43 which would not project as far into the housing and thus would not cause as much retraction of the jaws, so that the receiving opening defined by the jaws would more closely approximate the diameter of the smaller mandrel. In this manner, by use of different sized nose pieces 14, the mandrel receiving opening of the jaws is sized to the diameter of the particular mandrel being utilized.

With the parts of the tool in the position of rest shown in FIG. 2 of the drawings, a blind rivet can be inserted in the nose piece of the tool and then the nose piece is pressed against the hole or opening in the metal stock to be joined so as to cause the blind rivet head and the formable portion to be inserted into that opening. While holding the nose piece firmly against the metal stock so as to prevent displacement of the blind rivet, the operating handle 30 is moved forwardly toward the hand grip extension 38 to cause the yoke portion 32 to move in a rearward direction and displace the collet longitudinally rearwardly. As the gripping jaws 24 are retracted from their abutment with the inner end of the nose piece 14, they are displaced into gripping position by the spring loaded jaw expander 25 so that continued rearward movement of the collet in response to operation of the lever arm 30 causes a tensile force to be applied to the mandrel of the blind rivet, through the cross pin 21 and the draw bar 19 of the collet. The ratio between the long arm 37 of the lever 30 and the short arm 32 will ordinarily be on the order of 16:1 so that a grapping force of about 80 pounds applied to the long arm 37 will result in over 1000 pounds of force transmitted through the gripping jaws to the mandrel. As this force is applied to the blind rivet, the insert is deformed and the mandrel elongates and fractures in the manner previously described.

Due to the variations in operating conditions which have been previously mentioned, it is uncertain at what point in the stroke the fracture of the mandrel will occur. The total operative stroke of the collet body will ordinarily be established at 0.25 inch so as to accommodate a wide variety of variables in the operating conditions. The fracture might occur during the first 30% or 50% of the total operative stroke or it might occur during the second half of the stroke or near the end thereof. Whenever it occurs, the load on the collet is suddenly relieved and the operating arm 30 is brought quickly to the limit of its forward position. To avoid the jarring effect of this sudden abutment on the hand of the user, I have provided a resilient rubber shock absorbing pad 44 in the housing 10 in the path of movement of the long arm 37, so that this final abutting movement is cushioned and softened.

Upon release of the force on the operating arm 30, the spring arm 39 returns the arm rearwardly with a consequent forward displacement of the collet 12 until it abuts the annular shoulder 41. As the jaws 24 again are brought into abutment with the inner end of the nose piece, they open and release the spent mandrel which can then be discharged by gravity through the hollow jaw expander 25 and its guide tube 27 so that it exits through the rear of the draw bar 19.

Figure 5:
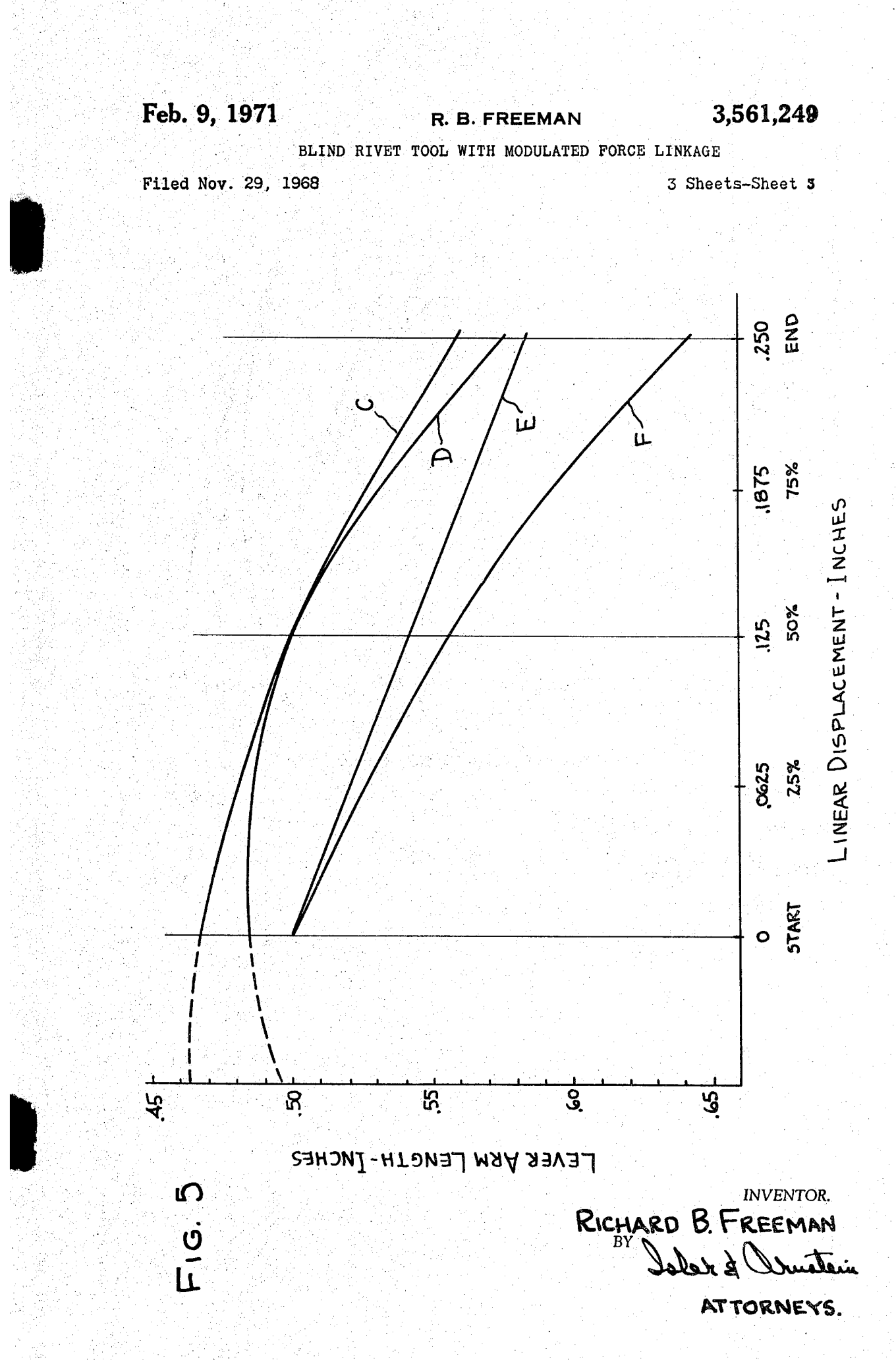

Referring now to FIGS. 4 and 5 of the drawings, I have shown in FIG. 4 the relationship between the cross pin 21 and the short lever arm 32 of the operating arm as the operating arm moves from the starting position to its final position in the operative stroke. The starting position is shown by the phantom outline designated A, the relative position at 50% of the stroke is shown in solid lines, and the relative position at the end of the operative stroke is shown in the phantom outline designated B.

Geometrically, the shortest possible lever arm is defined by the tangent to the cross pin 21 when the axis of the cross pin and the axis of the pivot pin are aligned in a plane which is normal to the direction of travel of the collet as defined by the longitudinal axis of the collet. For convenience, this may be referred to as the "centered" position of the parts. It will be noted, that in the starting position shown in phantom outline A, the parts are not in the centered position so that the optimum mechanical advantage from the shortest possible lever arm 32 is not attained. However, although the shortest possible lever arm might be desirable strictly from the standpoint of lever ratios and mechanical advantage, one must take into consideration the angle of contact of the lever arm in relation to the direction of movement which it is desired to produce by movement of the lever arm. With this in mind and considering the total effective force in the direction of desired movement of the collet, it will be noted that the starting position of the parts has been arranged so that the cross pin 21 is shifted slightly to the right of the centered position thus reducing the angle of contact of the lever arm to about 15° from the considerably larger angle of contact that would have existed if the parts were in the centered position. The effect of this shift from the centered position for the starting position is graphically indicated in FIG. 5 and will be described in greater detail hereinafter.

As the operating arm is forced forwardly to move the short arm 32 rearwardly the short arm rotates to a so-called "square" position in which its tangential contact with the cross pin 21 is vertically aligned with the center or axis of the pivot pin 31 so that the thrust of the arm is all in the direction of travel of the collet. This square position may be considered to represent an angle of contact of 0° in which there are no directional force components other than that force component which is coincident with the axis of the collet. This position occurs when the collet has moved through 50% of its stroke and represents a condition when the full available mechanical advantage is obtained, without modification by the angle of contact.

Continued movement of the operating arm 37 causes further rearward displacement of the collet in the line defined by its longitudinal axis until the limit of movement of the arm 37 is reached, at which point the stroke is completed. This position of the parts is shown in the phantom outline B, with the short arm 32 defining an angle of contact which is approximately 13°, but the length of the lever arm is longer than it was in the starting position as it is making its contact on the upper surface of the cross pin 21 in the ending position.

In summary, the force linkage is designed so that the short lever arm is disposed at an angle of contact to the cross pin in the starting position and this angle of contact is reduced to zero when the parts reach the square position representing 50% of the stroke, and the angle of contact then again increases so that at the end of the stroke it approximates the same angle of contact as the starting angle. The effect of this is graphically illustrated in FIG. 5 where the curve of the length of the lever arm as it changes during the stroke is plotted against the displacement of the collet and then is again shown as modified by the angle of contact which exists during the stroke. Referring now specifically to FIG. 5, the horizontal scale represents the linear displacement of the collet in hundredths of inches from start to finish of the operating stroke and based upon a total displacement of 0.25 inch. The vertical scale represents the length of the short lever arm 32 in thousandths of inches and is based upon the cross pin having a diameter of 0.375 inch and being spaced 0.50 inch from the axis of the pivot pin 31 in the centered position.

The curve C indicates the changing length of the lever arm during the total stroke and also includes a portion showing the data that would obtain if the start of the stroke commenced with the parts in the centered position, it being understood that this portion of the curve is informative only for comparative purposes and is not utilized as the actual start of the stroke in the force linkages which have been plotted.

The curve D shows the effect of the angle of contact of the lever arm in modifying the curve C to reflect the effective force or equivalent lever arm length which is available as a component of thrust in the direction of displacement of the collet.

The curve E is based upon the same dimensional relationships described for the curve C as applied to the previously described prior art force linkage systems in which the starting position of the lever arm is the square position where the angle of contact is zero so that maximum effectiveness of the mechanical advantage is attained at the start. The curve F represents the modification of the curve E by reason of the bearing angle of contact, similar to that previously described with reference to the curve D.

It will be noted that in my form of force linkage, a shorter lever arm could be attained if the parts were in the centered position at the start but that the angle of contact in that position would be approximately 22° thus modifying the mechanical advantage, as shown on the curve D, to a point where it is well below the effective force which is obtained by using the slightly longer lever arm and more acute angle of contact for the starting of the stroke. Comparing the curves D and F, it will be noted that the curve D, representing the effective mechanical advantage, is fairly level from the start of the stroke to a position of about 40% of the stroke, where it commences to drop off at a fairly uniform rate to the end of the stroke. The comparable mechanical advantage curve F for the prior art form of force linkage at a starting angle of zero, an angle of contact of 19° midway through the stroke, and an angle of contact of 25° at the end of the stroke, creating an immediate drop off of mechanical advantage as soon as the stroke is started and causing this drop off to occur at a greater rate than is indicated by the curve D. As a consequence, it will be noted that my effective mechanical advantage under the same conventional conditions is greater at the start and throughout the stroke than that of the prior art form of force linkage. Furthermore, I obtain substantial uniformity of mechanical advantage during the first 40% of the stroke where the fracture is most likely to occur and the load is greatest and then maintain a lesser rate of drop off in the mechanical advantage to the end of the stroke. This results in less manual force being required to accomplish the same effective displacement force on the collet and greater uniformity and ease in the operation of the tool.

Instead of utilizing the arcuate lever arm of the prior art and having it disposed forwardly of a linear abutting surface, I utilize the linear lever arm contact against the cylindrical surface of the cross pin which is disposed rearwardly of the lever arm so that the rate of increase in the length of the short lever arm during the stroke is diminished. Further, by starting the stroke at an angle of contact which represents the optimum effective mechanical advantage of the force linkage system, rather than at the square starting position favored by the prior art, I attain a substantially uniform effective mechanical advantage during the first 40% of the stroke and a lower rate of effective force drop off in the remainder of the stroke.

It will also be noted that the two-part collet consisting of the jaw retaining portion 18 and the draw bar 19 which are threadedly joined to each other by the threaded stem or extension 45 of the draw bar, provide a means for adjusting to some extent the characteristics of the force linkage system at the starting position, thereby permitting compensation for wear or for such other purpose as may be desired. By rotating the collet portion 18 relatively to the portion 19, the portion 19 is threadedly displaced so that the position of the cross pin 21 relatively to the pivot pin 31 can be changed. As previously explained by reference to FIG. 5 of the drawings, such a change would cause the starting position to occur at some other point on the curve D, either ahead of or beyond the starting point designated in FIG. 5. This adjustment is accomplished by removing the collet 12 from the housing 10 and making the necessary change in the threaded engagement between the parts 18 and 19. If desired, a spacer of selected thickness can be interposed in the space 46 at the point of connection between the portions 18 and 19, so that the threaded securement will be tight at the adjusted overall length of the collet 12.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a manually operable draw bar tool having a longitudinally displaceable work-engaging draw bar and pivotally mounted lever means operatively engaging said draw bar, the combination of a cylindrical cross pin transversely mounted in said draw bar and projecting therefrom, yoke means provided on the short arm of said lever means and slidably engaging said cross pin, said yoke means having a semicircular recess conforming substantially to the periphery of said cross pin and provided with tangential linear extensions projecting to opposite sides of said cross pin, a housing defining a linear path of movement for said draw bar, draw bar abutment means provided on said housing to define the forwardmost position of said draw bar and the resulting rearwardmost starting position of said lever means, and lever abutment means provided on said housing in the path of movement of the long arm of said lever means, whereby pivotal movement of said long arm to an ending position on said lever abutment means causes longitudinal rearward displacement of said draw bar from said forwardmost position to a rearwardmost position to transmit a tensile force to the work engaged thereby.

2. A combination as defined in claim 1 including parallel side walls provided on said housing in close proximity to the ends of said cross pin whereby axial rotation of said draw bar in said housing is obstructed.

3. A combination as defined in claim 1 wherein said draw bar is hollow and including gripping jaws mounted by said draw bar, a hollow jaw expander element having one end thereof engaging said gripping jaws and provided with a hollow guide tube at its other end, said guide tube slidably traversing said cross pin within said draw bar and having communication with an open mandrel-discharge end of said draw bar.

4. A combination as defined in claim 1 wherein said short arm of said lever means is tangentially disposed in contact with said cross piece at a lower portion than at an acute angle of thrust relatively to the direction of displacement of said draw bar when said draw bar is in its forwardmost starting position, said short arm passes through a square position relatively to said cross pin in response to pivotal movement of said lever means, and said short arm tangentially engages the upper portion of said cross pin at the ending position thereof, at an angle of thrust substantially equal to the contact angle of said short arm at the starting position thereof.

5. A combination as defined in claim 4, wherein said cross pin is disposed rearwardly of said short arm between the starting and ending positions of said displacement of said draw bar.

6. A combination as defined in claim 4, including means carried by said draw bar for adjustably displacing the starting position of said cross pin relatively to said short arm of said lever means whereby to modify said starting angle of thrust.

7. A combination as defined in claim 1, wherein said lever abutment means is a resilient shock absorbing cushion.

References Cited
UNITED STATES PATENTS

| | | | |
|---|---|---|---|
| 2,170,323 | 8/1939 | Gorshkoff | 72—391 |
| 3,048,296 | 8/1962 | Herdenvolf | 29—200X |
| 3,426,572 | 2/1969 | Lahnston | 72—391 |

HARRISON L. HINSON, Primary Examiner

U.S. Cl. X.R.

29—200